(12) United States Patent
Sanders

(10) Patent No.: US 9,246,866 B1
(45) Date of Patent: Jan. 26, 2016

(54) ITEM RECOMMENDATION

(71) Applicant: Amazon Technologies, Inc., Reno, NV (US)

(72) Inventor: Adam Callahan Sanders, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 394 days.

(21) Appl. No.: 13/706,874

(22) Filed: Dec. 6, 2012

(51) Int. Cl.
*H04L 12/58* (2006.01)
*G06Q 10/10* (2012.01)

(52) U.S. Cl.
CPC ............... *H04L 51/32* (2013.01); *G06Q 10/10* (2013.01); *H04L 51/046* (2013.01)

(58) Field of Classification Search
CPC . H04L 51/046; H04L 51/32; G06F 17/30265; G06F 17/30749; G06Q 10/10
See application file for complete search history.

(56) References Cited

U.S. PATENT DOCUMENTS

| | | | |
|---|---|---|---|
| 8,671,029 B2* | 3/2014 | Kassaei et al. | 705/26.7 |
| 2009/0164475 A1* | 6/2009 | Pottenger | 707/10 |
| 2010/0088726 A1* | 4/2010 | Curtis et al. | 725/45 |
| 2010/0131385 A1* | 5/2010 | Harrang et al. | 705/26 |
| 2010/0241699 A1* | 9/2010 | Muthukumarasamy et al. | 709/203 |
| 2011/0188742 A1* | 8/2011 | Yu et al. | 382/159 |
| 2011/0282745 A1* | 11/2011 | Meoded et al. | 705/14.61 |
| 2012/0151511 A1* | 6/2012 | Bernard et al. | 725/10 |
| 2013/0159132 A1* | 6/2013 | Adams | 705/26.7 |
| 2013/0159858 A1* | 6/2013 | Joffray et al. | 715/719 |
| 2013/0226937 A1* | 8/2013 | Moritz et al. | 707/748 |

* cited by examiner

*Primary Examiner* — Michael C Lai
(74) *Attorney, Agent, or Firm* — Thorpe North & Western LLP

(57) ABSTRACT

A method is described for making a recommendation for an item. The method may include the operation of presenting a recommendation interface control to a user on a client device after the user has consumed an item. Using the recommendation interface control, the user then selects an individual and adds the name of the item the user consumed to the selected individual's recommendation list.

24 Claims, 10 Drawing Sheets ical device. Many recommendation options are now available that may include among others methods: sending a recommendation to one or more persons via email, texting, instant message, or posting a recommendation on a social networking site. For example, a recommender may want to recommend a movie that the recommender has just finished watching online. The recommendation may be sent to a friend in an email or the recommender might post the recommendation to a social networking site. Although convenient, these methods have drawbacks that may result in the recipient not taking advantage of the recommendation.

Drawbacks may include recommendations that are lost or forgotten by the recipient, or where the intended recipient may not have viewed the recommendation. For example, recommendations sent in an email may end up in an inbox cluttered with junk mail and other non-related messages. Then to later use the email containing the recommendation, the recipient may need to search the inbox to find the recommendation. In another scenario involving email, the recipient's mailbox may become so overwhelmed by the number of emails containing recommendations that the recipient may be unable or unwilling to keep up with the volume. In another situation concerning social media, recommendations posted to a social networking site may quickly become stale as new postings are made, and those who occasionally log into the site may not see the recommendation.

DETAILED DESCRIPTION

A technology is described to allow a recommender to make recommendations to others for items that the recommender has consumed. For example, at the conclusion of viewing a video streamed over the internet, a user may want to recommend the video to others that the user has reason to believe would also want to watch the video. Using the system that the user used to watch the video, the user at the conclusion of the video may be presented with an option that enables the user to select one or more of the user's associates. An associate may be a friend, a family member, work associate, or just an acquaintance of the user. After the user has selected an associate, the title of the video then may be placed in a list or queue that belongs to the associate but the list is open to others so that others may place recommendations into the list. The next time the associate logs into the associate's account, the title of the video that the user added to the associate's recommendation list may be available to the associate. The terms list and queue, may be used interchangeable throughout this discussion.

In addition to recommending videos, as further described below, recommendations may be made for various other types of media such as movies, TV programs, music, audio books or any other type of media that a user may consume via the system. Also recommendations for retail items may be added to an associate's recommendation list. For example, while shopping at an online retailer, a user may have purchased an item that the user knows a friend has been looking for at a certain price. At the conclusion of the checkout process, the user may be presented with a dialog that enables the user to select the friend from a number of the user's friends and associates and make a recommendation to the friend that the friend buy the item. The name of the recommended item may then be added to the friend's social item queue alerting the friend that the item has been recommended by the user.

Figure 1:
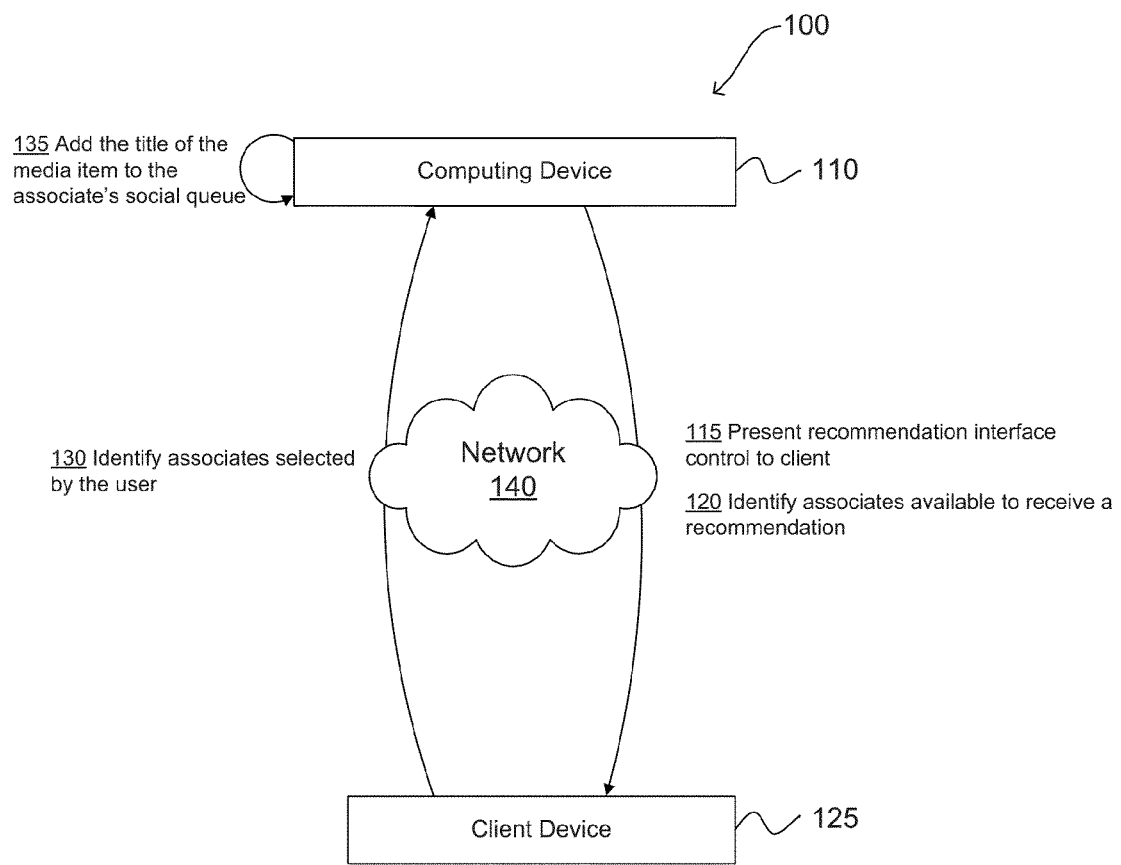
FIG. 1 is a diagram illustrating a method for recommending a media item.

FIG. 1 provides an example of a networked computing environment 100 illustrating item recommendation. The networked environment 100 may include one or more computing devices 110 that are in data communication with one or more client devices 125 by way of a network 140. The network 140 may include an intranet, the Internet, a local area network, a wide area network, a wireless data network, or any other network or combination thereof. Communication over the network may be enabled by wired or wireless connections and combinations thereof. A client device 125 may be, but not limited to, a desktop computer, a laptop, a television, a car navigation system, or any device with a display that may receive and present the page content. Additionally, the client device 125 may be a mobile device. In one example, the mobile device is a tablet device, a cell phone, a laptop computer, an electronic book reader, set-top box, game console, heads up display (HUD) glasses, or another mobile computing device.

In this example, a user that has accessed an item using a client device 125 may, as in 115, be presented with a recommendation interface control that may be executed using the client device 125. The recommendation interface control may be presented from the computing device 110 over a network 140 to the client device 125. For example, a user that has accessed a movie using a mobile device may be presented with a dialog that gives the user the ability to send a recommendation for the movie to an associate. The recommendation interface control may be presented after the user has finished watching the movie, after the user pauses the movie, after the user stops the movie, and/or after the user has purchased the movie. As a further example, a user may watch a portion of a movie and be inspired to share a recommendation with an associate who the user believes would be interested in the movie. Rather than making the recommendation after the movie has finished, the user may instead want to pause the movie and make the recommendation while the thought is fresh in the user's mind. In another example, should the user decide not to watch the entire movie, the user may still recommend the movie to an associate despite having not finishing the movie.

As in 120, at least one associate that may be available to receive a recommendation may be identified. The identification of at least one associate may be sent from the computing device 110 over a network 140 to the client device 125. For example, associates that the user interacts frequently with may be cached in the computing device 110 and may be identified as being available to receive a recommendation. The user's associates may be stored as an unorganized list of associates, stored alphabetically, listed by priority, listed by number of recommendations, or the user may organize the user's associates into a group of associates defined by an associate's relationship to the user. To illustrate, associates may be grouped according to a family relationship, or some other relationship such as coworker, sports team member, or student. By organizing associates into groups, the process in 120 may identify the groups as available to receive a recommendation.

In another example, a group of associates may be identified where the user belongs to a group of associates having an interest in a topical category that is shared among the group of associates. In other words, the user may join a group where a topical category that the user enjoys is shared among the group. To illustrate, a user that enjoys cooking may join a group that has a topical category of "cooking". Members of this group may recommend to each other cooking videos, instructional cooking TV shows, cooking audio books, etc. When the operation in 120 identifies associates available to receive a recommendation and the topical category of the media item accessed is "cooking", the operation may identify the "cooking" group as being available to receive a recommendation.

As in 130, associates selected by the user may be identified and sent over a network 140 from the client device 125 to the computing device 110. Selected associates may entail one associate, or may comprise a plurality of associates. For example, the user may want to recommend a nature video which the user accessed to the user's associates Bob and Jim. The user may select Bob and Jim from the list of available associates and the operation in 130 may identify Bob and Jim as being selected to receive the recommendation. Also, as described above, associates may be grouped together allowing a user to select a group of associates that then may be identified by the process in 130. Borrowing from the example above where a user belongs to a group having a media category of "cooking", the user may have watched a cooking instructional video and now may want to share the video with the cooking group. The user may select the cooking group and the operation in 130 may identify the group as being selected to receive the recommendation.

As in 135, after the selected associates have been identified, the title of the item accessed by the user may be added to the selected associate's social queue, thereby making a recommendation for the item to the selected associates. A social queue may be a queue that belongs to an associate. The associate's social queue may be made available to the user for receiving recommendations (and probably not for viewing by anyone besides the associate) so that recommendations for items may be added to the social queue. A recommendation may be added to a social queue by placing the title of an item into the associate's social queue. As an example, a user who accessed a TV series may want to recommend the TV series to a coworker. After selecting the coworker, the name of the TV series then may be added to the coworker's social queue, resulting in a recommendation for the TV series made to the coworker. A similar recommendation may be made for a purchased item. Where a user has purchased a new garlic press, the user may receive an email later with a request to provide a review on the garlic press product. The email may also include an interface (e.g. button) to recommend the garlic press to an associate if they liked the garlic press.

In addition, a recommendation may be added to a plurality of social queues for a group of associates. For example, as described above, associates may be grouped based upon an associate's relationship to the user. When a user selects a group of associates, the title of the media item may be added to the social queues of the group. To illustrate, where a group of family members may be composed of a brother, sister and cousin, the title of the media item may be added to the brother's social queue, the sister's social queue and the cousin's social queue.

As is described above, a user may join a group of associates having an interest in a media category that is shared among the group of associates. The title of a media item may be added to a social queue that is shared by the group of associates. Again using the example of the media category of "cooking", a user may add a media item titled "cooking made easy" to a social queue that is accessible to the members of the cooking group.

In an example, subsequent to adding a title of an item to an associate's social queue, the title of the item may be presented to the associate when the associate's social queue is next accessed by the associate. In other words, the next time that the associate accesses the associate's social queue, the title of the item may be visible to the associate.

In another example, subsequent to adding a title or name of an item to an associate's social queue, the associate may be presented with an acceptance interface control 340 (e.g., accept or reject buttons) that may allow the associate to accept the recommendation. To illustrate, a user may have added a title of a movie to the associate's social queue that the user enjoyed. Using a client device 125, the associate may accept the movie recommendation and the movie title may remain in the associate's social queue. Should the associate not have an interest in watching the recommended movie, the associate may decline to accept the recommendation and the title of the movie may be removed from the associate's social queue.

In an example where the user may want to include a text comment with a recommendation, the text comment along with the title of a media item may be added to an associate's social queue. When the associate next accesses the associate's social queue, the text comment may be available to the associate to read. To illustrate, a user may want to recommend a movie to a friend, but may want to warn the friend about a certain scene in the movie. The user may include the comment "Great movie, but the shower scene was terrifying". The comment along with the movie title "Psycho" may be added to the friend's social queue for the user to accept or reject.

In addition to an associate accessing the associate's social queue to view recommendations made to the associate, a visual indicator may be incorporated into a media item description that informs an associate that the user has added the title of the media item to the associate's social queue. To illustrate, as an associate browses through movie descriptions looking for a movie that the associate may want to watch, a visual indicator such as text or an icon may be incorporated into the movie description letting the associate know that the movie is in the associate's social queue.

Figure 2A:
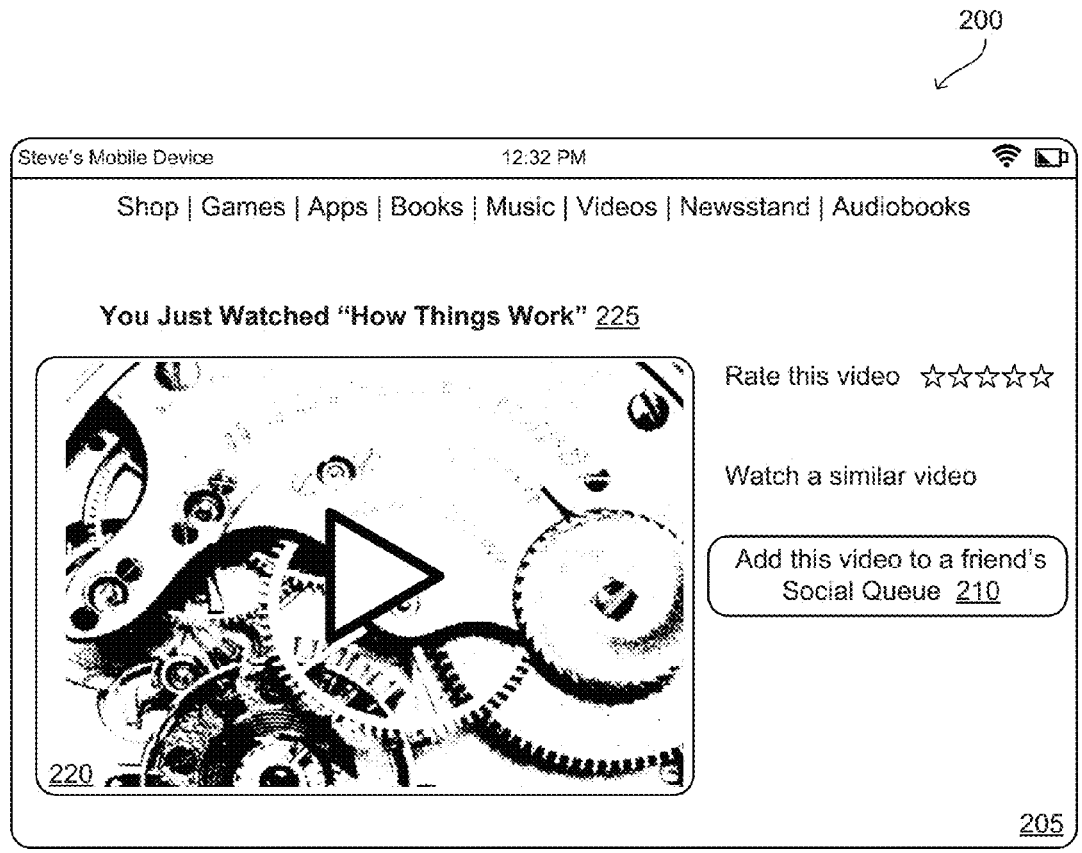
FIG. 2a-2c are illustrations that depict examples of user interfaces associated with item recommendation.

Moving now to FIG. 2*a*, an example of a user interface 205 is depicted as may be rendered by a client device 200. In this example, the client device 200 may be a mobile device such as a smartphone or tablet computer. The user interface may include an integrated media player for displaying and playing a media file 220, an interface control for displaying the title 225 of the media that the user accessed and a button 210 for recommending the media title to a friend. In this example, the user of the client device 200 has consumed a video. The title 225 indicates that the user has just watched a video entitled "How Things Work". Upon consuming the video, the button 210 may be presented to the user enabling the user to add the title of the video file to a friend's social queue.

Figure 2B:
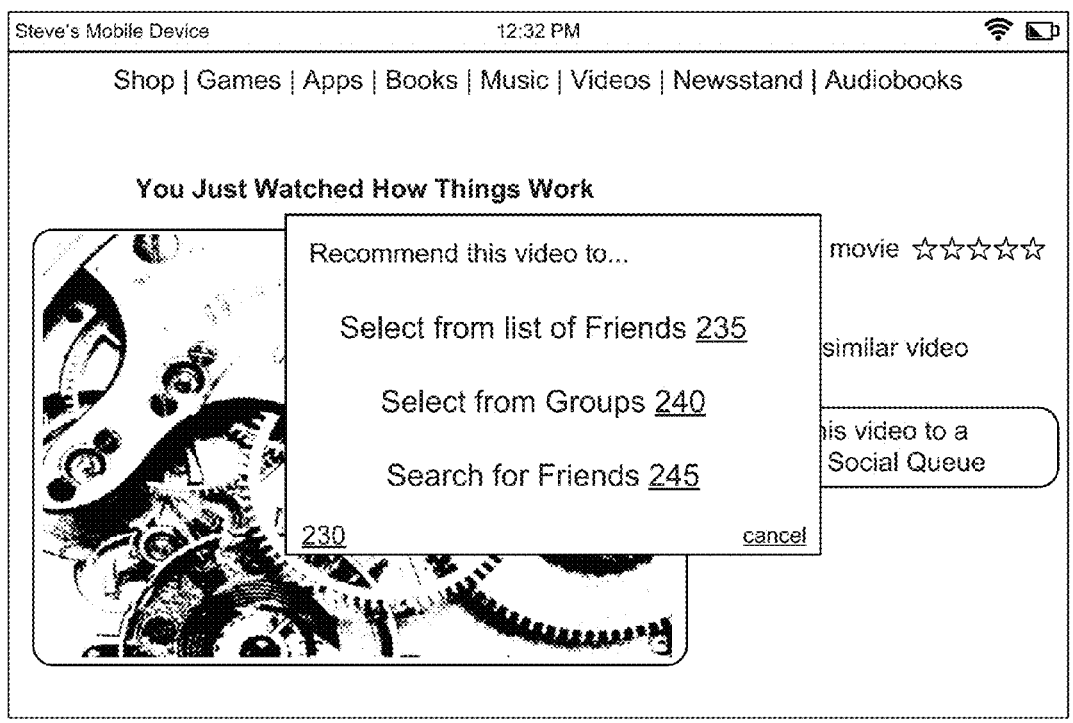

FIG. 2*b* provides a further example of a user interface where a user has selected the button 210 (FIG. 2*a*) to add a video to a friend's social queue. The user is presented with a selection interface control 230 containing a menu. The menu items may include options to "Select from list of friends" 235, "Select from groups" 240, or "Search for friends" 245. The option to "Select from list of friends" 235 may present to the user a list of friends and the user then may choose from the list. Whereas the option to "Select from groups" 240 may present to the user a list of groups that the user may have created or groups that have been predefined. Last, the option to "Search for friends" 245 may enable the user to search a data store for the user's friends or to find individuals that the user would like to add as friends.

Figure 2C:
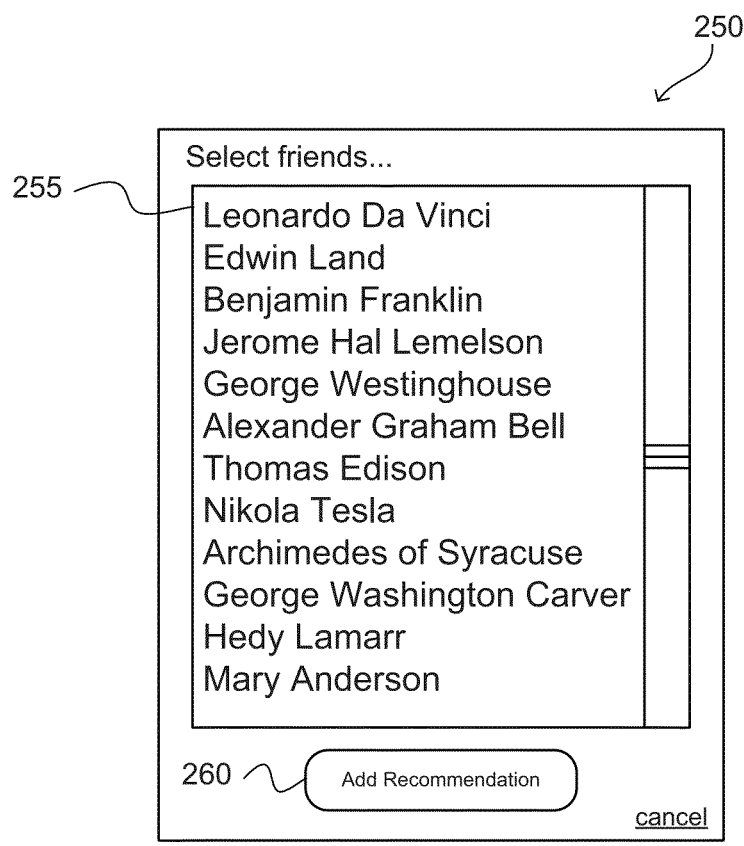

FIG. 2*c* depicts an example interface control 250 that may be rendered on a client device subsequent to selecting a menu option from the selection interface control 230 (FIG. 2*b*). The interface control 250 may contain a list of friends 255 that are available to receive a recommendation for the video consumed by the user. The user may choose one or more friends from the list and then select the add recommendation button 260 to add the recommendation to the friend's social queue.

Figure 3:
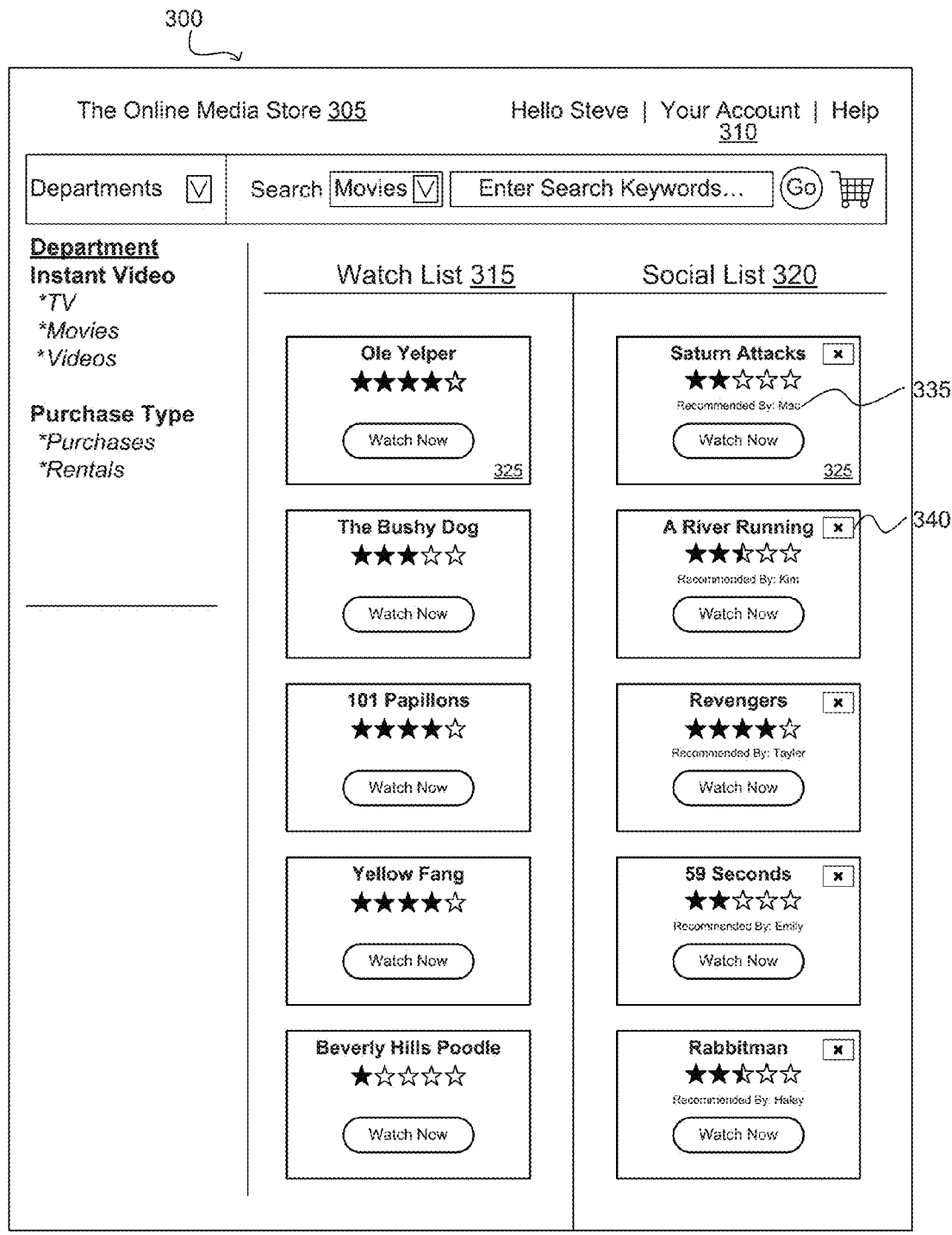
FIG. 3 is a drawing that depicts an example of a page illustrating access to content and associated recommendations.

FIG. 3 is one example of a page 300 as rendered by a client device. In this non-limiting example, a user is logged into an online retail media store 305 and is presented with a page that contains the user's account 310 information. The account information may include a user's watch list 315 and a user's social list 320. The user's watch list 315 may contain a list of media titles 325 that the user has added to the list. The user's watch list 315 may be a list of media titles 325 that the user has an interest in viewing. The watch list 315 may be exclusive to the user where the user may add and remove media titles 325 from the list and the user may view the contents of the list. Whereas the social list 320 may or may not be open to other individuals who the user has granted permission to add media titles 325 to the social list. Media titles 325 added to the user's social list may include the name of the recommender 335.

Figure 4:
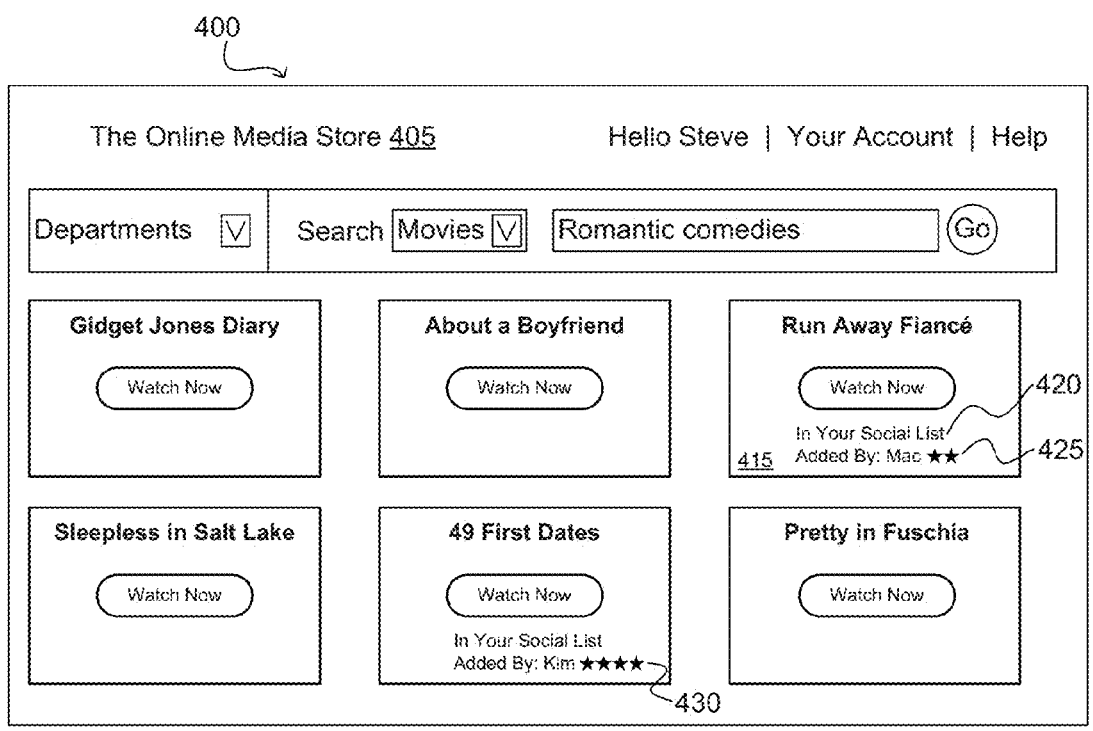
FIG. 4 is a drawing that depicts an example of a page illustrating access to content and a recommendation success rate.

Another example page 400 as rendered by a client device is illustrated in FIG. 4. Shown is an online retail media store 405 where a user may search or browse for a movie. A number of movie choices 415 may be presented to the user from which the user may make a selection. A movie choice 415 may include a visual indicator 420 that may alert a user that a recommender may have added the movie choice 415 to the user's social list.

Also a recommendation success rate 425 may be displayed along with the recommender's name. A recommender may be assigned a success rate where the success rate is determined by the number of recommendations that are accepted or rejected by an associate or referred user. For example, a user may accept or reject a recommendation that may be added to the user's social list. When a recommendation is accepted by the user, the success rate of the recommender may increase. The inverse may be true for recommendations that are rejected by the user causing the recommender's success rate to decrease. A higher success rate may indicate to a user that recommendations made by the recommender may be of value as compared to recommenders with low success rates. A success rate 425 may be displayed as a star rating, an award rating, a percentage, or by any visual depiction that may show the success of recommendation acceptance. For example, in FIG. 4 the recommender Mac has a two star success rate 425, whereas the recommender Kim has a four star success rate 430. Kim's recommendation success rate 430 may be higher as indicated by the number of stars as compared to Mac's recommendation success rate 425 of two stars.

Figure 5:
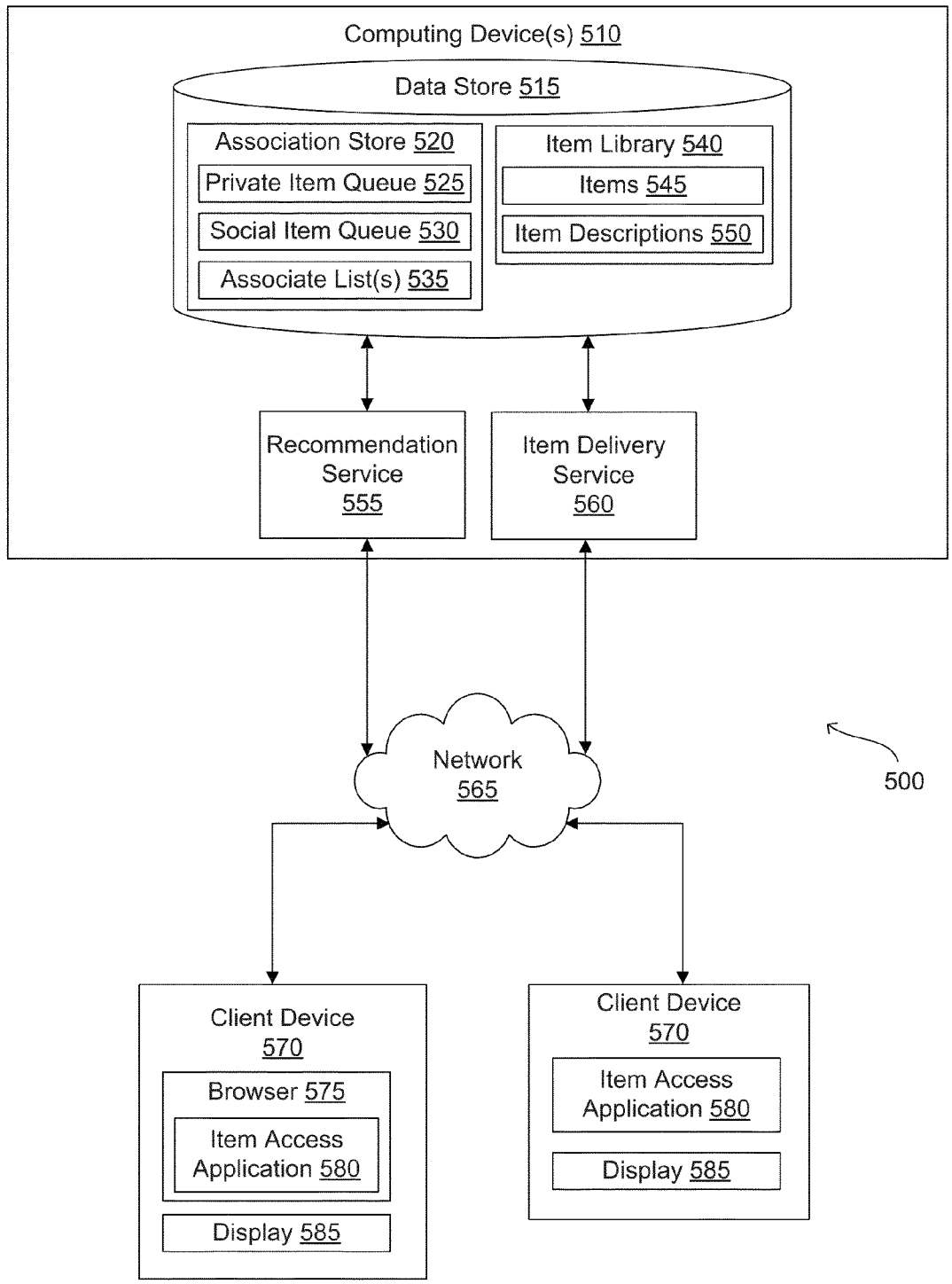
FIG. 5 is a block diagram illustrating an example system for recommending an item.

FIG. 5 provides an example of a networked computing environment 500 for this technology. The networked computing environment 500 may include one or more computing devices 510 in data communication with one or more client devices 570 by way of a network 565. The network 565 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

The computing devices 510 may comprise, for example, a server computer or any other system providing computing capability. Alternatively, a plurality of computing devices 510 may be employed that are arranged, for example, in one or more server banks or computer banks or other arrangements. For purposes of convenience, the computing device 510 is referred to in the singular, it is understood that a plurality of computing devices 510 may be employed in the various arrangements as described above.

Various processes and/or other functionality may be executed in the computing environment 500 according to various embodiments. Also, various data may be stored in a data store 515 that is accessible to the computing device 510. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 515 may include storage systems such as a SAN (Storage Area Network), cloud storage network, volatile or non-volatile RAM, optical media, or hard-drive type media. The data store 515 may be representative of a plurality of data stores 515.

The data stored in the data store 515 may include, for example, an association store 520 and an item library 540. The association store 520 may include a private item queue 525, a social item queue 530 and associate lists 535. A private item queue 525 may be a queue that is owned by a user. A watch list 315 (FIG. 3) may be an example of a private item queue 525 and similarly, a private item queue 525 may be such that the user may add items or remove items from the queue and the queue itself and the items contained within the queue are visible to the user alone. An example of media items that may be contained in a private item queue 525 may include items such as movie titles, TV titles, video titles, audio book titles, and/or any other type of media item that may be referenced by placing a description in a queue. For example, while a user is browsing through a media library catalog, the user may come across a movie that the user is interested in viewing sometime in the future. The user may add the title of the movie to the user's private item queue 525 so that the user may come back to the private item queue 525 at a later time to find the movie reference when the user is ready to view the movie. Another example of items that may be added to a private item queue 525 are retail product and service descriptions of items such as household item names, clothing items, electronic items, physical goods, online services, local services that may be available to purchase from an online retailer and that the user may want to purchase at a later date. For example, a user may be shopping for a particular item but the user is not ready to make a purchase until the item is offered at a lower price. The user may add the item to the user's private item queue 525 and reference the queue when the item is offered at a price that is acceptable to the user. And in another example, a user may want to add a service item to the user's private item queue 525, for instance an online music service that the user may be interested in but is not ready to subscribe to. It will be appreciated that a private item queue 525 may contain a combination of media items, retail product items and/or service items, or that a plurality of private item queues 525 may be created allowing for queues that contain media items separately and queues that contain retail product items separately.

A social item queue 530 may be a queue that is owned by the user, but may or may not be visible to the user's associates and may be open to receive recommendations from the associates so that the associates may add recommendations for items by adding the name of an item to the user's social item queue 530. A social list 320 (FIG. 3) as described above may be an example of a social item queue 530. Recommendations for items added to the user's social item queue 530 by the user's associates may then be available to the user via the social item queue 530. Examples of recommended items that may be added to the social item queue 530 are the same as those items that may be added to a user's private item queue 525, as explained above.

A user's associates may be stored in the association store 520 in an associate list 535. An associate may be a user's friend, family member, coworker, electronic acquaintance or any other person having a relationship with the user. In one example, a user may add an associate to the associate list 535, and in another example an associate may make a request to the user to add the associate to the associate list 535.

Associates may be grouped or categorized within the associate list 535 by the user depending upon the user's preferences. A user may set up groupings where associates are grouped together based upon the relationship of the associate to the user. For example, a user may want to group the associates based upon the user's relationship to the associate, such as by family member, coworker, church member, etc. For instance, a user may want a group that includes immediate family members so that the user may recommend items that are relevant to the family's immediate circumstances. Also a user may want an associate group that contains members of the user's softball team, enabling the user to recommend purchase items that pertain to the sport of softball. As will be appreciated, the number of possible groups that the user may create may be vast, giving the user the flexibility to tailor recommendations to a specific circumstance or preference of a group. Further, the user may save time making recommendations to a group of associates by selecting the group rather than selecting each associate individually.

In addition to establishing groups of associates, a user may categorize associates based upon some other type of designation. Associates may be categorized based on interests such as those who enjoy horror movies, or those who enjoy the outdoors, etc. Categorizing associates may enable the user to make directed recommendations to a specific category of associates. For example, suppose a user has created a category of associates who are horror movie enthusiasts. After viewing a horror movie that the user thought was exceptionally scary, the user may add a recommendation for the horror movie to the plurality of social item queues 530 for a group of associates that the user has categorized as "horror movie lovers". As was described above, categorizing associates may save the user time, the user may simply select a category, for instance "horror movies", and the recommendation then may be made to the user's associates who are in that category.

The item library 540 may include items 545 and item descriptions 550. Items 545 may include media items, services and various products that a user may purchase or rent from an online retailer. Item descriptions 550 may include descriptions of a plurality of items, for example movies, videos, TV programs, user submitted video, audio books, podcasts, electronic books, electronic magazines, electronic periodicals, etc. To illustrate, a movie description may include the title of the movie. Item descriptions 550 may also include other details about the media, such as authors, performers, dates, ratings, reviews or other descriptions associated with the media. For example, an item description 550 for a movie may include the movie title, release date, film rating, genre, summary, cast and run time. These movie details may form an item description 550 that may be included with a recommendation made to an associate. Item descriptions 550 may also contain a plurality of descriptions for varying products and services that may be available to purchase from an online retailer. Item descriptions 550 may primarily contain the names of products and services, but may also include additional details such as color, weight, country of origin, quantity, price, shipping information or any other information that may be associated with the product or service. For example, a product description for a backpack may include the backpack's brand, color, material type, number of pockets, price, and shipping information. This information may form an item description 550 that may be included with a recommendation of the backpack to an associate. In another example, the item description may be for a service such as an online music service that may include service details like monthly price, available music file formats, terms and conditions, etc. These details may be included in a recommendation for the online music service.

A recommendation service 555 may be executed in the computing device 510 that applies logic allowing a user to provide a recommendation to an associate. The logic run by the recommendation service 555 may first determine the item most recently consumed on a client device 570. Where the item most recently consumed is a movie for example, the logic may determine that the item consumed is a media item and that the description for the item may be found in the item library 540 within the item descriptions 550. In another example where the item consumed is a product or service, the logic may determine that the item description may also be found in the item library 540 within the item descriptions 550. Information about the item determined by the logic may be held in memory and made available to subsequent logic and processes.

Next, logic may send a plurality of associates from the association store 520 to the client device 570. As described above, associates may be grouped into associate groups based on an associate's relationship to the user, or associates may be categorized based upon the interests of the associate. The logic may send a group of associates, a category of associates, and/or a list of the user's associates from the association store's 520 associate list 535 to the client device 570. In one example where the user has consumed a horror movie, the logic may send to the client device 570 a categorized group of associates that have been categorized as horror movie enthusiasts based upon the associate's consumption patterns. In another example, a user may have purchased a book about financial security and the logic may send the client device 570 a group of associates designated as a family group. And yet another example may be where a user may have purchased a board game for social gatherings and the logic may send to the client device 570 a general list of associates (e.g., social friends).

After the plurality of associates are sent to the client device 570, logic then may obtain a selection of an associate from the plurality of associates from the client device 570. For example, after logic may send a plurality of associates (i.e., an associate listing) to the client, a user may then choose those associates that the user desires to send a recommendation. Using the client device 570, the user then may select the associate, and the selection then may be obtained by the recommendation service 555. After the associate that the user selected has been obtained, logic then may store a name of the item recommended in a selected associate's social item queue 530. Further, where a user has selected a plurality of associates to share an item recommendation, the item name may be stored in a plurality of social item queues 530 owned by the plurality of associates.

In another example, the recommendation service 555 may further comprise logic that obtains a text comment entered by a user. The text comment then may be stored in the selected associate's social item queue 530 along with the name or title of the recommended item. To illustrate, in addition to sending an associate a recommendation for an item, the user may want to include a comment that goes along with the recommendation. For example, if the user is recommending a horror movie that the user found especially scary, the user may want to include a comment warning the associate that the user found the movie to be more frightening than what was expected.

An item delivery service 560 may instruct physical delivery of items 545 from the item library 540 to a client device 570 over a network 565. The network 565 may include any useful computing network, including an intranet, the Internet, a local area network, a wide area network, a wireless data network, or any other such network or combination thereof.

A client device 570 may be a device such as, but not limited to, a desktop computer, a laptop, a tablet, a mobile device, a television, a cell phone, a smartphone, a hand held messaging device, a set-top box, a gaming console, a personal data assistant, an electronic book reader, heads up display (HUD) glasses, a car navigation system, or any device with a display that may receive and present the media content. The client device 570 may be used to view items 545 by means of an item access application 580 that may communicate with the item delivery service 560 over the network 545. An item 545 may be viewed by a user on a display 585. In some examples, the client device 570 may include a browser 575 that may be coupled with an item access application 580. The browser 575 may enable a user to access an item 545 using the browser 575.

Certain processing services may be discussed in connection with this technology. In one example configuration, a service may have one or more processes executing on a server or other computer hardware. Such services may be centrally hosted functionality or a service application that may receive requests and provide output to other services or consumer devices. For example, services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service.

Figure 6:
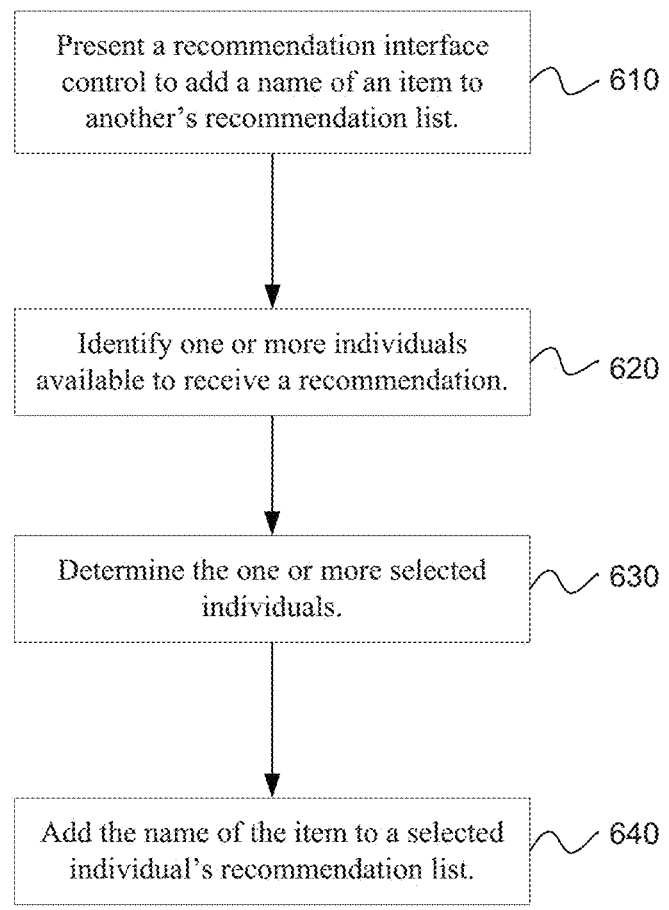
FIG. 6 is flowchart illustrating an example of a method for recommending an item.

FIG. 6 is a flow diagram illustrating one example of a technology to recommend an item. As is shown in box 610, after a user has consumed an item (i.e., viewed or listened to a media file, and/or purchased or rented a product or service.), a recommendation interface control may be presented to a user allowing a user to add a name of the item to another's recommendation list. For example, after a user has consumed an item, an interface control may be presented to the user on a client device. The client device may be a desktop computer, laptop, tablet, smartphone, cellular phone, etc. The item consumed by the user may include a media file, an item that the user has purchased from an online retailer, a service, or any other item that a user may consume using a client device. The recommendation interface control may allow the user to share a recommendation for the item by activating or selecting the control. Depending upon the client device, a number of different actions may activate the recommendation interface control, such as clicking, touching (e.g., in a touch sensitive device), pointing, selecting, as well as other actions.

As is shown in box 620, individuals available to receive a recommendation are identified and made available to the user to select. For example, after the user has activated the recommendation interface control in the previous operation, an individual who is willing to receive a recommendation from the user may be identified and presented to the user. The individual may be a friend, family member, coworker, or any other person who has given the user permission to add recommendations to the associate's recommendation list. In addition, a group of individuals defined by an individual's relationship to the user may be identified. For example, a user may create a group of individuals that comprises of family members, or a group of coworkers. As may be appreciated, a user may create any number of groups with whom the user may want to share recommendations.

In addition, group of individuals may be identified where an individual's consumption patterns may be similar to the consumption patterns of other individuals within the group. Consumption patterns may reveal information that identifies an individual's preferences. For instance, an individual's consumption patterns may indicate that the individual prefers movies that are categorized as romantic comedies. The individual may be identified along with other individuals that have a preference for movies that are romantic comedies. The individuals may form a group of individuals that include the user, who have a common preference. In addition, the consumption patterns of the group may reveal an item category that is the same as the item category of the item. In other words, the common preference that is similar to individuals among the group matches the item category of the item the user consumed. For example, where the user has consumed a movie that has a category of romantic comedies, individuals in the group identified in the process above may have a preference for romantic comedies. The group then may be presented to the user to select an individual's name from the next operation.

In another example, the user may have individuals that follow or subscribe to recommendations that the user may make. For example, a user may be a celebrity, or may be someone who is known within a community, or may simply have a following of individuals. The individuals that subscribe to a user's recommendations may be identified so that the individuals are available to the user to select. For example, a user may be a well-known film critic that may share recommendations for movies that the film critic highly recommends. The individuals that may subscribe to the film critic's recommendations may be identified and presented to the film critic in a user interface to allow the film critic to select one or more of these individuals to receive the film critic's recommendation. Thus, where the film critic may want to recommend the movie "To Kill a Mockingbird" to the film critic's subscribers, the individuals that subscribe to the film critic's recommendations may be identified and made available to the film critic to select.

As is shown in box 630, an individual that the user may have selected may be identified. Using a client device, the user may select the individual that the user wishes to share an item recommendation with. The individual that the user has selected may then be identified by the process. In addition to selecting an individual, the user may select a plurality of individuals or a group of individuals as described above.

As is shown in box 640, the name of the item that the user may be recommending may be added to the selected individual's recommendation list. For example, where the user recently consumed a media item, the name of the media item may be added to a recommendation list that belongs to the individual selected by the user in the previous process.

A recommendation list may contain a number of recommendations from a plurality of recommenders. Recommendations may be for anything that a recommender may consume on the client device. In addition to adding the name of an item to a recommendation queue, a user may add a text comment along with the name of the item to the individual's recommendation queue. For example, a user may add the text comment "Thought you might like this" to a recommendation for a product that the user believes an individual may be interested in. The text comment along with the name of the item may be added to the individual's recommendation list.

In addition, where a group of individuals defined by an individual's relationship to the user may have been selected by the user, the name of the item may be added to one recommendation list that is accessible to the group of individuals. For example, where the group selected by the user is comprised of the user's family members, the user may add a name of an item to a recommendation list that is accessible to the family member group. Where the grouping of individuals is accomplished by using an individual's consumption pattern information, the name of the item may be added to a plurality of recommendation queues for the group. For example, individuals of the group may receive the recommendation in the individual's own recommendation queue.

In another example, a visual indicator may be incorporated into an item's description informing an individual that the item has been added to the individual's recommendation queue. To illustrate, while browsing for new items to purchase, download or rent, a visual indicator may inform an individual viewing the item description that the item has been added to the individual's recommendation list. Specifically, highlighted text, an icon, or an animation may notify the individual that the item has been added to the individual's recommendation queue. The visual indicator may allow the individual to know what has been recommended prior to accessing the individual's recommendation queue.

While the flow diagrams illustrated in FIG. 6 may imply a specific order of execution, the order of execution may differ from what is illustrated. For example, the order of two or more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Figure 7:
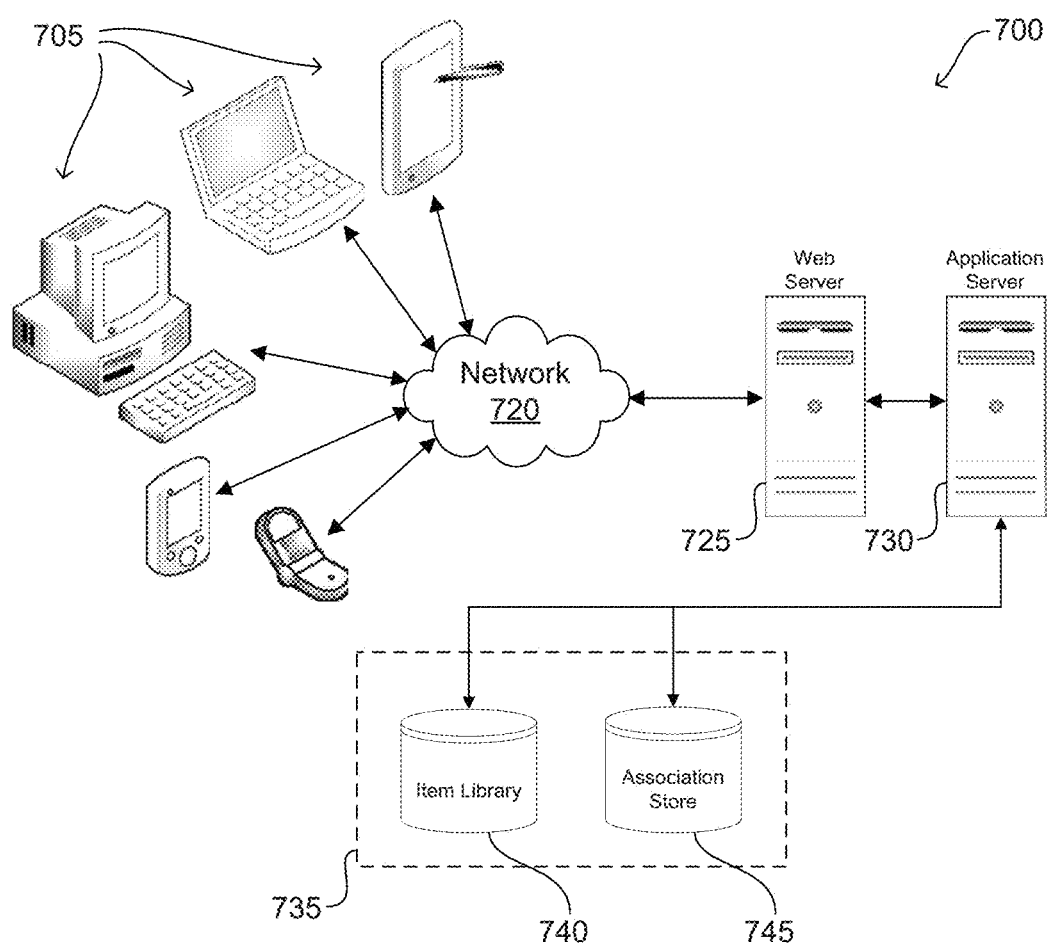
FIG. 7 is a schematic diagram illustrating an example environment for implementing the technology to recommend an item.

FIG. 7 is an example of an environment 700 for implementing the current technology. As will be appreciated, although a web-based environment is used for the purposes of explanation, different environments may be used to implement various examples. The environment 700 includes a client device 705, which may include any device capable of sending and receiving information over a network 720. Examples of a client device 705 include personal computers, tablet computers, laptop computers, smartphones, cellular phones and the like. The network 720 may include any appropriate network, including an intranet, the Internet, a cellular network, a local area network, or any other network or combination thereof. Communication over the network may be enabled by wired or wireless connections, and combinations thereof. The example environment 700 includes a web server 725 for receiving requests and serving content in response thereto. As would be apparent, an alternative server device serving a similar purpose may be used for other types of networks.

The example environment 700 includes at least one application server 730 and a data store 735. It should be understood that several application servers, layers, or other elements, processes, or components may be used that may interact to perform tasks such as obtaining data from a data store. The data store 735 may be representative of a plurality of data stores as can be appreciated. The application server 730 may provide access control services in cooperation with the data store and may be able to generate content such as text, graphics, audio, and/or video to be transferred or made available to the user, which may be served to the user by the web server 725 in the form of HTML, XML, or another appropriate structured language. Handling of all requests, responses and delivery of content between the client device 705 and the application server 730 may be handled by the web server 725.

The data store 735 may include data tables, databases, or other storage mechanisms and media for storing data relating to this technology. In this example, the data store 735 may include mechanisms for storing an item library 740 and an association store 745, as described earlier. The stored information may be used to serve content to client devices 705. The data store 735 may also include a mechanism for storing information received from the client devices 705.

The example environment 700 is a distributed computing environment utilizing several computer systems and components that are interconnected via communication links, using one or more computer networks or direct connections. It will be appreciated that such a system may operate equally well in a system having fewer or greater number of components than are illustrated in FIG. 7. Thus the depiction of the environment 700 should be taken as being illustrative in nature and not limiting to the scope of the disclosure.

Figure 8:
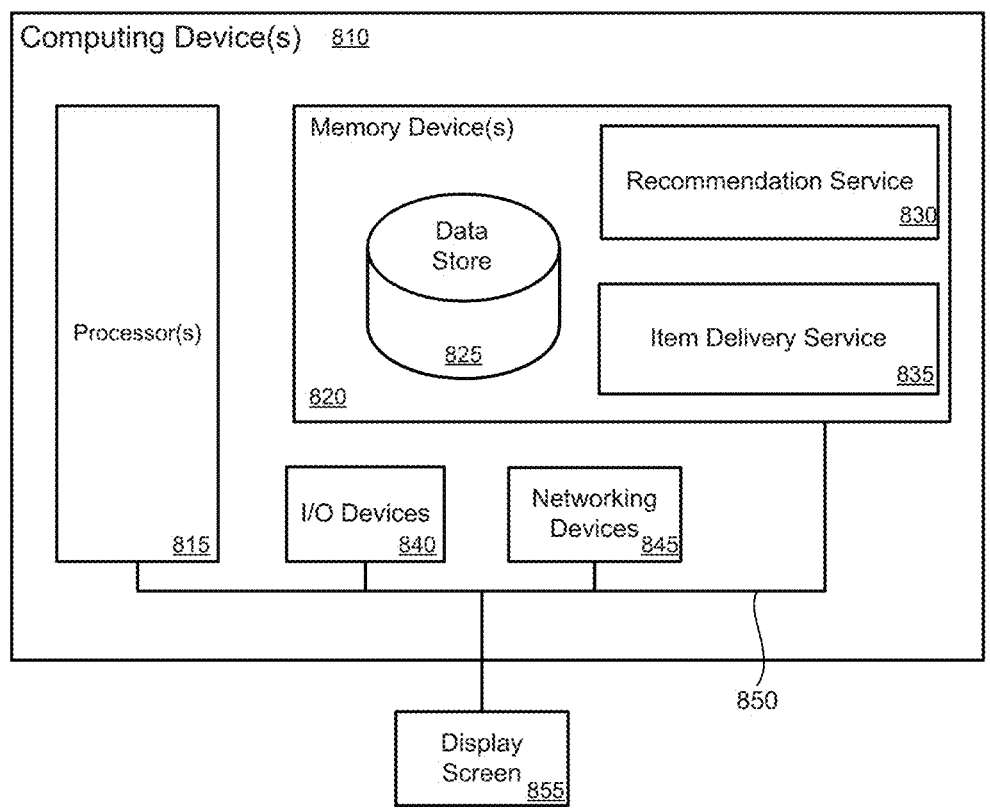
FIG. 8 is block diagram illustrating an example of a computing device that may be used for recommending an item.

FIG. 8 illustrates a computing device 810 on which modules of this technology may execute. A computing device 810 is illustrated on which a high level example of the technology may be executed. The computing device 810 may include one or more processors 815 that are in communication with memory devices 820. The computing device 810 may include a local communication interface 850 for the components in the computing device. For example, the local communication interface may be a local data bus and/or any related address or control busses as may be desired.

The memory device 820 may contain modules that are executable by the processor(s) 815 and data for the modules. Located in the memory device 820 are modules executable by the processor. For example, a recommendation service module 830, a data item deliver service module 835 and other modules may be located in the memory device 820. The modules may execute the functions described earlier. A data store 825 may also be located in the memory device 820 for storing data related to the modules and other applications along with an operating system that is executable by the processor(s) 815.

Other applications may also be stored in the memory device 820 and may be executable by the processor(s) 815. Components or modules discussed in this description that may be implemented in the form of software using high programming level languages that are compiled, interpreted or executed using a hybrid of the methods.

The computing device may also have access to I/O (input/output) devices 840 that are usable by the computing devices. An example of an I/O device is a display screen 855 that is available to display output from the computing devices. Other known I/O device may be used with the computing device as desired. Networking devices 845 and similar communication devices may be included in the computing device. The networking devices 845 may be wired or wireless networking devices that connect to the internet, a LAN, WAN, or other computing network.

The components or modules that are shown as being stored in the memory device 820 may be executed by the processor(s) 815. The term "executable" may mean a program file that is in a form that may be executed by a processor 815. For example, a program in a higher level language may be compiled into machine code in a format that may be loaded into a random access portion of the memory device 820 and executed by the processor 815, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 815 may represent multiple processors and the memory 820 may represent multiple memory units that operate in parallel to the processing circuits. This may provide parallel processing channels for the processes and data in the system. The local interface 850 may be used as a network to facilitate communication between any of the multiple processors and multiple memories. The local interface 850 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method to recommend a media item, comprising:
    under control of a processor and memory configured with executable instructions, presenting a recommendation interface control to add a title of the media item to an associate's social queue after a user has accessed the media item;
    identifying at least one associate to form an associate list available to receive a recommendation;
    identifying at least one selected associate from the associate list to receive the recommendation;
    adding the title of the media item to a social queue for the at least one selected associate to make a recommendation for the media item; and
    including a visual indicator in a media item description for the media item that informs the at least one selected associate that the title of the media item has been added to the social queue for the at least one selected associate.

2. The method as in claim 1, further comprising presenting the associate's social queue with the added title of the media item when the social queue is accessed by the associate.

3. The method as in claim 1, further comprising presenting an acceptance interface control to an associate to allow the associate to accept the title of the media item added to the associate's social queue.

4. The method as in claim 3, further comprising assigning a success rate to a recommender where the success rate is determined by a number of recommendations that are accepted or rejected by an associate.

5. The method as in claim 1, wherein identifying at least one associate further comprises identifying a group of associates defined by an associate's relationship to the user.

6. The method as in claim 5, wherein adding the title of the media item to the at least one selected associate's social queue further comprises adding the title of the media item to a plurality of social queues for the group of associates.

7. The method as in claim 1, wherein identifying at least one associate further comprises identifying a group of associates where the user belongs to a group of associates having an interest in a topical category shared among the group of associates.

8. The method as in claim 7, wherein the interest in the topical category shared among the group of associates is that of a topical category of the media item.

9. The method as in claim 8, wherein adding the title of the media item to the at least one selected associate's social queue further comprises adding the title of the media item to a social queue that is accessible to the group of associates.

10. The method as in claim 1, wherein adding the title of the media item to the at least one selected associate's social queue further comprises adding a text comment along with the title of the media item to the associate's social queue.

11. A method to recommend items, comprising:
    under the control of a processor and memory configured with executable instructions,
        presenting a recommendation interface control to add a name of an item to another's recommendation list;
        identifying an individual available to receive a recommendation;
        identifying a selected individual to receive the recommendation;
        adding the name of the item to a recommendation list for the selected individual; and
    including a visual indicator in a media item description for the media item that informs the selected individual that the name of the media item has been added to the recommendation list for the selected individual.

12. The method as in claim 11, wherein identifying an individual further comprises identifying a group of individuals where the group is defined by a relationship that is shared among the individuals of the group.

13. The method as in claim 12, wherein adding the name of the item to an individual's recommendation list further comprises adding the name of the item to a recommendation list that is accessible to the group of individuals.

14. The method as in claim 11, wherein identifying the individual further comprises identifying a group of individuals where an individual's consumption patterns are similar to consumption patterns of other individuals within the group.

15. The method as in claim 11, wherein identifying a group of individuals further comprises identifying a group of individuals having consumption patterns that match an item category of the item.

16. The method as in claim 15, wherein adding the name of the item to the individual's recommendation list further comprises adding the name of the item to a plurality of recommendation lists for the group.

17. The method as in claim 11, wherein identifying an individual further comprises identifying a plurality of individuals that subscribe to a recommender's recommendations.

18. The method as in claim 11, wherein adding the name of the item to the individual's recommendation list further comprises adding a text comment along with the name of the item to the individual's recommendation list.

19. A system to recommend an item comprising:
a computing device;
an association store stored in a data store accessible to the computing device, the association store including a plurality of associated associates and social item queues;
an item library stored in a data store accessible to the computing device, the item library storing item descriptions for a plurality of items;
an item delivery service to instruct delivery of items from the item library to a client device over a network;
a recommendation service that is executable in the computing device, the recommendation service comprising;
logic that determines an item consumed via a client;
logic that sends to the client a plurality of associates from the association store;
logic that obtains a selected associate from the plurality of associates from the client;
logic that stores in a social item queue for the selected associate a name of an item recommended; and
logic that includes a visual indicator in a media item description for the media item that informs the selected associate that the title of the media item has been added to the social item queue for the selected associate.

20. The system as in claim 19, wherein the association store further comprises a plurality of associate groups where the plurality of associate groups are defined by an associate's relationship to other associates in the plurality of associate groups.

21. The system as in claim 19, wherein the association store further comprises a plurality of categorized groups of associates where the plurality of categorized groups of associates is defined by a topical category.

22. The system as in claim 19, wherein the recommendation service further comprises logic that obtains a text comment entered by a user; and
logic that stores in the selected associate's social item queue the text comment.

23. The system as in claim 19, wherein the recommendation service further comprises logic that stores a description of the item recommended in a selected associate's social item queue.

24. The system as in claim 19, wherein logic that sends to the client the plurality of associates from the association store further comprises logic that sends to the client a plurality of associates that have an interest in the item consumed on the client, where an associate's interest is determined by an associate's consumption patterns.

* * * * *